(12) United States Patent
Friend et al.

(10) Patent No.: US 11,643,054 B2
(45) Date of Patent: May 9, 2023

(54) VEHICLE MOVING DEVICES AND METHODS FOR MOVING A VEHICLE

(71) Applicant: Toyota Motor Engineering & Manufacturing North America, Inc., Plano, TX (US)

(72) Inventors: Ronald Scott Friend, Jeffersonville, KY (US); Robert Aaron Allex, Ewing, KY (US); Brian McElroy, Winchester, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1085 days.

(21) Appl. No.: 16/359,605

(22) Filed: Mar. 20, 2019

(65) Prior Publication Data

US 2020/0298806 A1    Sep. 24, 2020

(51) Int. Cl.
*B60S 13/00*  (2006.01)
*B62B 5/00*   (2006.01)

(52) U.S. Cl.
CPC .......... *B60S 13/00* (2013.01); *B62B 5/0043* (2013.01); *B62B 5/0066* (2013.01); *B62B 2202/90* (2013.01)

(58) Field of Classification Search
CPC ......... B60S 13/00; B62B 5/0043; B62B 5/66; B62B 2202/90
See application file for complete search history.

(56) References Cited

U.S. PATENT DOCUMENTS

| | | | | |
|---|---|---|---|---|
| 4,687,070 A | * | 8/1987 | Ricciardi | B66F 7/246 180/343 |
| 5,433,469 A | * | 7/1995 | Cassels | B62B 1/264 280/655 |
| 5,709,520 A | * | 1/1998 | Pish | B60S 13/00 414/427 |
| 11,155,247 B1 | * | 10/2021 | Ebrahimi Afrouzi | B62D 33/0636 |

(Continued)

FOREIGN PATENT DOCUMENTS

| | | |
|---|---|---|
| EP | 0442874 B1 | 8/1994 |
| JP | 2006001661 A | 1/2006 |

(Continued)

OTHER PUBLICATIONS

"Universal car hydraulic wheel movement machine Car moving hydraulic trailer vehicle mobile device" (https://es.aliexpress.com/item/M-quina-de-movimiento-de-coche-hidr-ulico-rueda-Universalcoche-Mover-remolque-hidr-ulico-veh/32853446198.html). Accessed/Published Date: Dec. 19, 2018.

(Continued)

*Primary Examiner* — Saul Rodriguez
*Assistant Examiner* — Ashley K Romano
(74) *Attorney, Agent, or Firm* — Dinsmore & Shohl LLP

(57) ABSTRACT

A vehicle moving device for moving a vehicle from a first location to a second location includes a frame having a first end and a second end. A driving wheel is coupled to the first end of the frame and configured to contact a vehicle wheel at a first wheel location. A holding arm is coupled to the second end of the frame opposite the driving wheel and configured to contact the vehicle wheel at a second wheel location. The holding arm holds the vehicle wheel in contact with the driving wheel as the driving wheel rotates the vehicle wheel.

13 Claims, 5 Drawing Sheets

(56) References Cited

U.S. PATENT DOCUMENTS

| | | | |
|---|---|---|---|
| 11,254,162 B1* | 2/2022 | Tseng | B62B 5/064 |
| 2004/0033127 A1* | 2/2004 | Roseman | B62D 51/04 |
| | | | 414/608 |
| 2011/0224845 A1* | 9/2011 | Perry | G06F 11/30 |
| | | | 701/99 |
| 2012/0138374 A1* | 6/2012 | Pezzuti | B60S 13/00 |
| | | | 180/15 |
| 2013/0076004 A1* | 3/2013 | Perry | B60S 13/00 |
| | | | 280/402 |
| 2013/0134685 A1* | 5/2013 | John | B60S 13/02 |
| | | | 414/812 |
| 2014/0262565 A1* | 9/2014 | Stieff | B66F 7/246 |
| | | | 180/54.1 |
| 2017/0203778 A1* | 7/2017 | Jackson | B62B 5/0036 |
| 2017/0210437 A1* | 7/2017 | Black | B62B 5/0089 |
| 2017/0291463 A1* | 10/2017 | Cedergren | B60G 3/01 |
| 2018/0142488 A1* | 5/2018 | Boussard | E04H 6/182 |
| 2018/0201174 A1* | 7/2018 | Larsen | B60P 3/077 |
| 2018/0297505 A1* | 10/2018 | Idelevitch | E04H 6/36 |
| 2019/0322205 A1* | 10/2019 | Dombrowski | B60S 13/00 |
| 2020/0148512 A1* | 5/2020 | Herrera | B66D 1/005 |
| 2020/0180572 A1* | 6/2020 | Tzivanopoulos | B62D 15/0285 |
| 2020/0180695 A1* | 6/2020 | Tzivanopoulos | B62D 15/021 |
| 2020/0180696 A1* | 6/2020 | Tzivanopoulos | B60S 13/00 |
| 2020/0180712 A1* | 6/2020 | Ibenthal | B62D 39/00 |
| 2021/0031735 A1* | 2/2021 | Hong | B60B 30/10 |
| 2021/0188605 A1* | 6/2021 | Herzog | B66F 7/065 |

FOREIGN PATENT DOCUMENTS

| | | |
|---|---|---|
| JP | 6103710 B2 | 3/2017 |
| WO | 2013111663 A1 | 8/2013 |
| WO | 2018088946 A1 | 5/2018 |

OTHER PUBLICATIONS

"Stringo Vehicle Movers" (https://www.aalhysterforklifts.com.au/index.php/newforklifts/specialist_equipment/stringo_vehicle_movers). Accessed/Published Date: Dec. 19, 2018.

* cited by examiner

VEHICLE MOVING DEVICES AND METHODS FOR MOVING A VEHICLE

TECHNICAL FIELD

The present specification generally relates to moving devices and methods and, more specifically, to vehicle moving devices and methods for moving a vehicle.

BACKGROUND

Vehicles may need to be moved from one area to another where operating the vehicle to drive the vehicle between positions is undesirable or not possible. For example, during manufacturing, assembly of the vehicle may not be completed such that the vehicle is operational to be driven. Accordingly, to affect movement of a vehicle from one location to another wherein operation of the vehicle is undesirable or unfeasible, external manipulation may be used. For example, a hydraulic wheel jack may be used to lift a vehicle from contact with the ground. Once lifted from contact, the vehicle may then be moved to a desired location, by contacting one or more of the vehicle's A surfaces (e.g., the front hood and/or the rear trunk area) to push the vehicle to the desired location. However, such contact may cause unintentional damage to the A surface of the vehicle.

Accordingly, there is a need for a vehicle moving device and methods that do not require contact with vehicle A surfaces.

SUMMARY

In one embodiment, a vehicle moving device for moving a vehicle from a first location to a second location includes a frame having a first end and a second end. A driving wheel is coupled to the first end of the frame and configured to contact a vehicle wheel at a first wheel location. A holding arm is coupled to the second end of the frame opposite the driving wheel and configured to contact the vehicle wheel at a second wheel location. The holding arm holds the vehicle wheel in contact with the driving wheel as the driving wheel rotates the vehicle wheel.

In another embodiment, a method for moving a vehicle from a first location to a second location using a vehicle moving device that includes arranging a vehicle wheel of the vehicle within a frame of the vehicle moving device. The frame includes a first end and a second end, a driving wheel coupled to the first end of the frame, and a holding arm coupled to the second end of the frame opposite the driving wheel. The method further includes contacting the vehicle wheel at a first wheel location with the driving wheel, contacting the vehicle wheel at a second wheel location with the holding arm, and rotating the driving wheel to move the vehicle from the first location to the second location. The holding arm holds the vehicle wheel in contact with the driving wheel as the driving wheel rotates the vehicle wheel.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
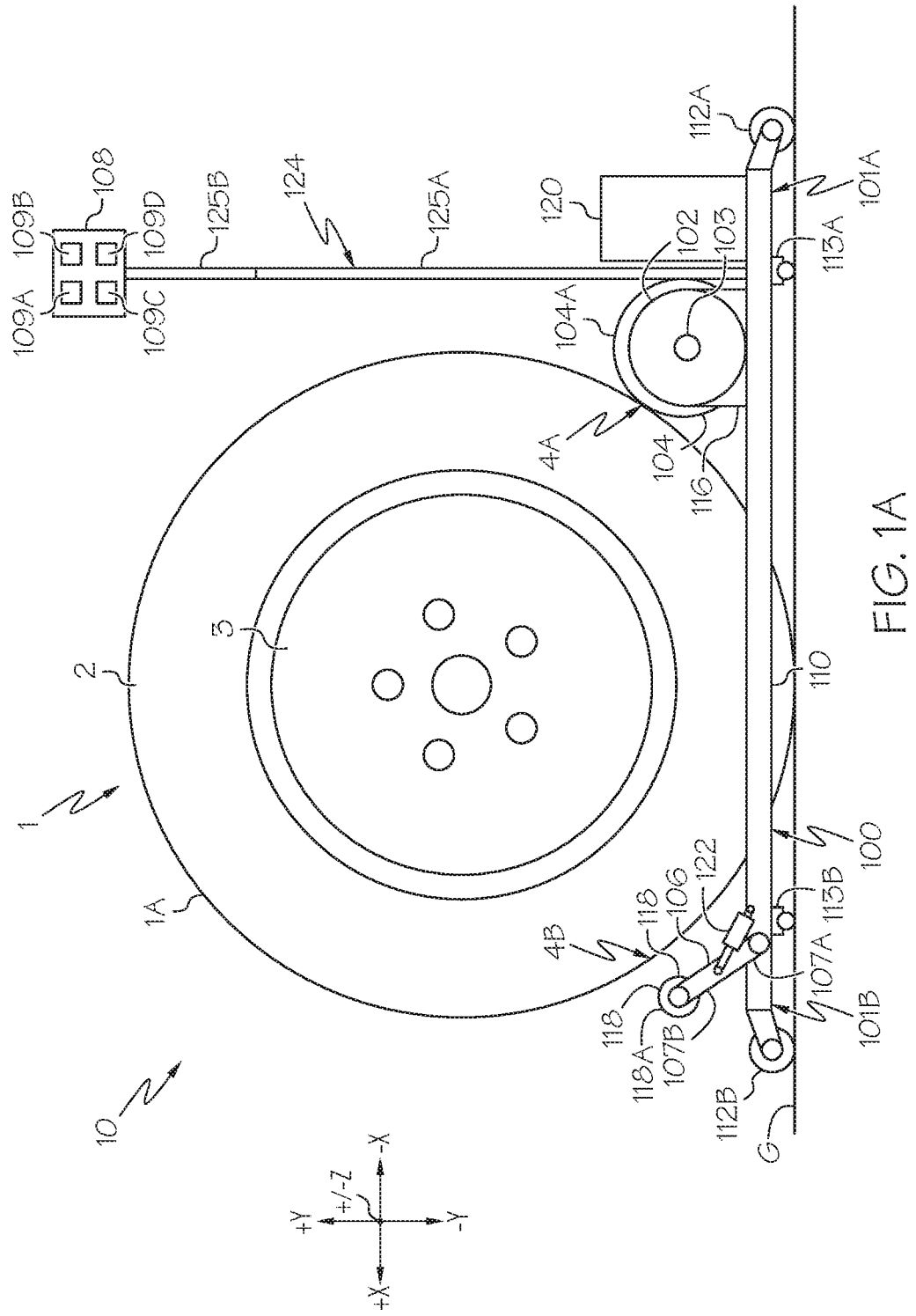
FIG. 1A schematically depicts a vehicle moving device disengaged from a vehicle wheel as viewed along the −Z-axis of the depicted coordinate axes, according to one or more embodiments shown or described herein.

FIG. 1A generally depicts an embodiment of a vehicle moving device for moving a vehicle from one location to a second location. The vehicle moving device generally includes a frame, a driving wheel, and a holding arm. As will be described in greater detail herein, the vehicle moving device may be easily and securely attached to a vehicle wheel without needing to lift the vehicle from contact with the ground. For example, the vehicle wheel may be positioned between the driving wheel and holding arm, such that the holding arm may hold the vehicle wheel in contact with the driving wheel as the driving wheel rotates the vehicle wheel. Rotation of the vehicle wheel by the driving wheel may cause the vehicle to move across a surface upon which the vehicle is positioned. An operator may be positioned within the vehicle to steer the vehicle as the vehicle moving device causes the vehicle wheel to rotate. Accordingly, the vehicle may be moved without contacting any vehicle A surface (e.g., finished/painted outer surfaces including but not limited to the hood, trunk, vehicle door panels, or any other outer body panels). Furthermore, movement of the vehicle can achieved without lifting a vehicle wheel from contact with the ground. Various embodiments of the vehicle moving device and methods will be described in greater detail herein.

As used herein, the term "vehicle longitudinal direction" refers to the forward-rearward direction of the vehicle (i.e., in the +/−vehicle X-direction of the depicted coordinate axes). The term "vehicle lateral direction" refers to the cross-vehicle direction of the vehicle (i.e., in the +/−vehicle Z-direction of the depicted coordinate axes), and is transverse to the vehicle longitudinal direction. The term "vehicle vertical direction" refers to the upward-downward direction of the vehicle (i.e., in the +/−vehicle Y-direction of the depicted coordinate axes). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a vehicle centerline. The term "inboard" as used herein refers to the relative location of a component with respect to the vehicle centerline. Because the vehicle structures may be generally symmetrical about a vehicle centerline, the direction to which use of terms "inboard" or "outboard" and refer may be mirrored about the vehicle centerline when evaluating components positioned along opposite sides.

Figure 1B:
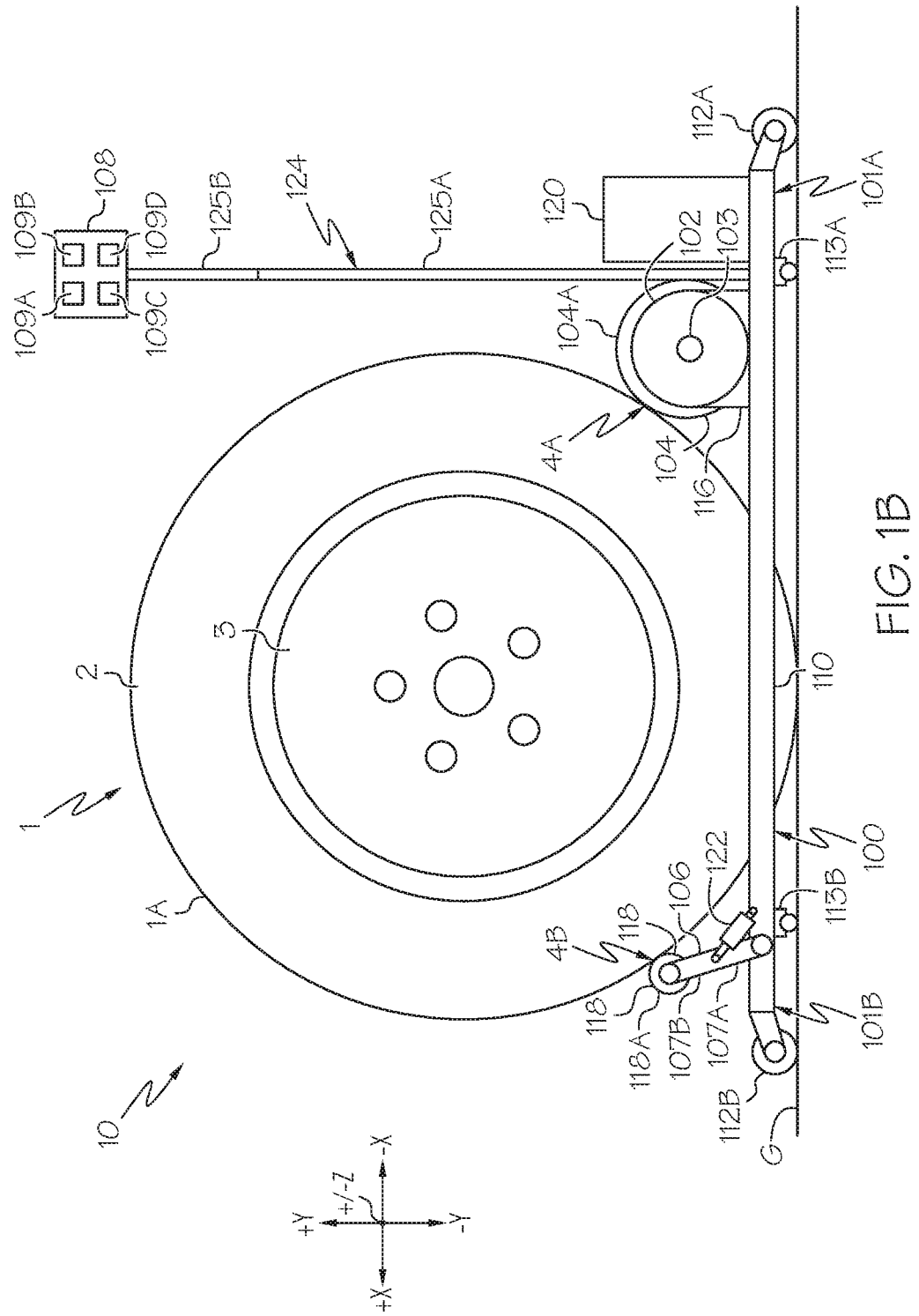
FIG. 1B schematically depicts the vehicle moving device of FIG. 1A engaged with the vehicle wheel as viewed along the −Z-axis of the depicted coordinate axes, according to one or more embodiments shown or described herein.

Referring now to FIGS. 1A and 1B, an embodiment of a vehicle moving device 10 is generally depicted. As illustrated, the vehicle moving device 10 may include a frame 100, a motor 102, a driving wheel 104, a holding arm 106, and a user input device 108. As will be described in greater detail herein, the vehicle moving device 10 is configured to rotate a vehicle wheel 1 to cause a vehicle to which the vehicle wheel is attached to move from a first location to a second location. It is noted that the present vehicle moving device may be used to move any type of vehicle including terrestrial, aquatic, and/or airborne vehicles. It is noted that the vehicle wheel 1 may include a tire 2 and a hub 3. However, it is contemplated that the present vehicle moving device 10 may be used to move wheeled objects not including a tire.

The frame 100 may include a first end 101A and a second end 101B. The first end 101A and the second end 101B may define a vehicle wheel proceeding portion and a vehicle wheel preceding portion. That is, when assembled to a vehicle wheel 1, the frame 100 wraps around the vehicle wheel such that a portion of the frame 100 is positioned directly forward of the vehicle wheel 1 and a portion of the frame 100 is positioned rearward of the vehicle wheel 1. For example, and with reference to FIGS. 2 and 3, the frame 100 may include a first laterally extending frame member 114A at the first end 101A and a second laterally extending frame member 114B at the second end 101B. The first laterally extending frame member 114A and the second laterally extending frame member 114B may define the first and second ends 101A, 101B of the frame 100, respectively. When mounted to the vehicle wheel 1, the vehicle wheel 1 may be arranged between the first and second laterally extending frame members 114A, 114B. It is noted that first laterally extending frame member 114A or second laterally extending frame member 114B may be positioned forward or rearward of the vehicle wheel 1 without departing from the scope of the present disclosure.

Figure 2:
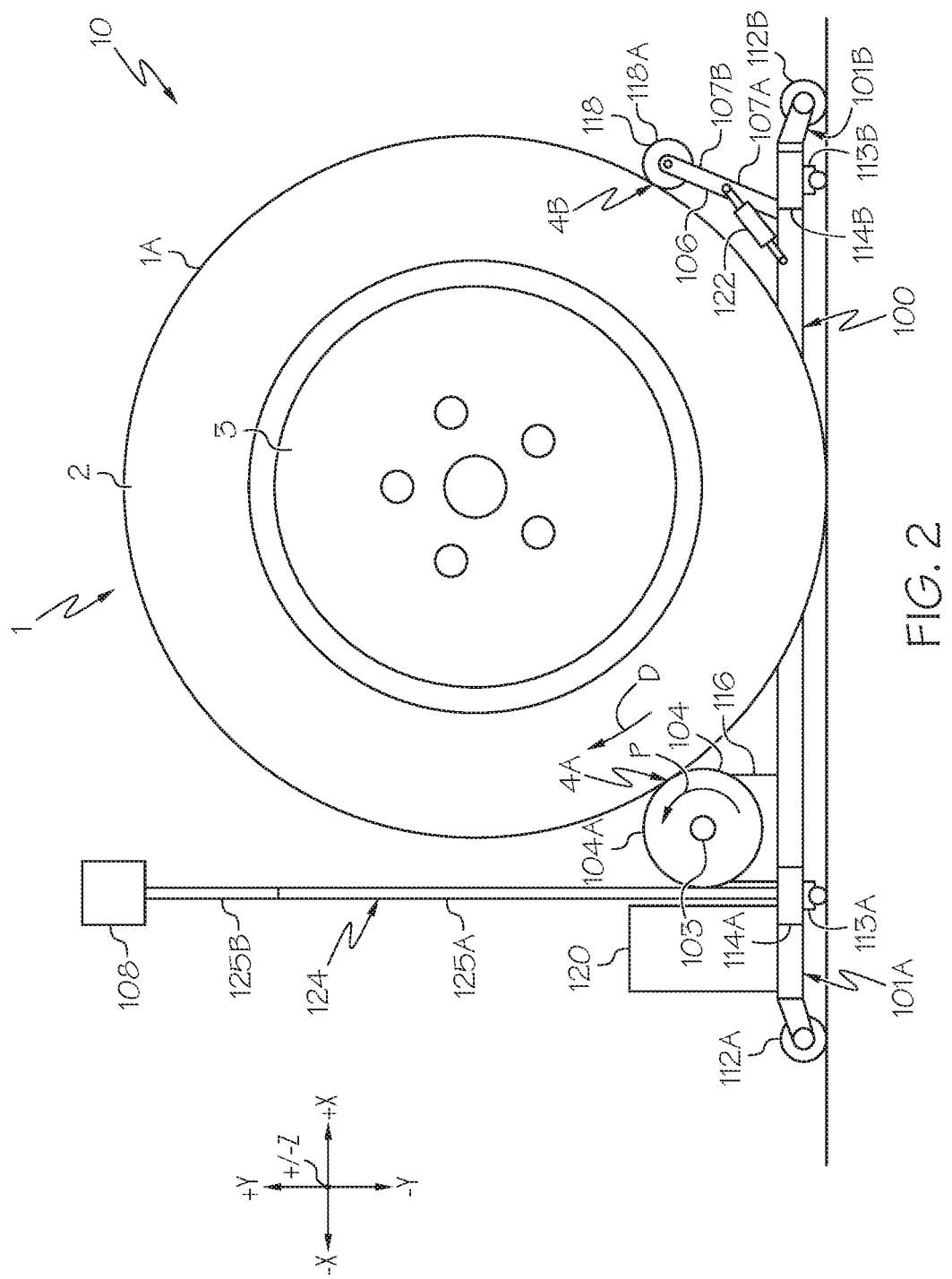
FIG. 2 schematically depicts the vehicle moving device of FIG. 1A as viewed along the +Z-axis of the depicted coordinate axes, according to one or more embodiments shown or described herein.

Referring again to FIGS. 1A and 1B, the frame 100 may further include a longitudinally extending frame member 110 extending between the first end 101A and second end 101B, as shown in FIG. 1A. The first laterally extending frame member 114A may be coupled proximate to a first end of the longitudinally extending frame member 110 and the second laterally extending frame member 114B may be coupled proximate to the second end of the longitudinally extending frame member 110. The longitudinally extending frame member 110 may be positioned perpendicularly to the first and second laterally extending frame member 114A, 114B. Referring briefly to FIG. 2, the frame 100 may not form a complete enclosure around the vehicle wheel 1. That is, the frame 100 may be open at one side to allow the first and second laterally extending frame members 114A, 114B to be slid into position around the vehicle wheel 1.

It is noted that the frame 100 and/or various components thereof may be made from a variety of materials. For example, in one non-limiting embodiment the frame 100 is made from metal tubing (e.g., 2 in. steel tubing). Such tubing may have various cross-sections including but not limited to circular, ovular, rectangular, triangular, or other regular or irregular polygonal shapes. In some embodiments, the frame 100 is made from an integral piece of rigid material, or several pieces welded together.

Referring again to FIGS. 1A and 1B, coupled to the frame 100 may be one or more wheels. For example, a plurality of wheels may be coupled to the frame 100. For example, the frame 100 may include wheels 112A, 112B and wheels 113A, 113B. The wheels 112A, 112B may be coupled to the longitudinally extending frame member 110, with the wheel 112A arranged on the first end 101A, and the wheel 112B arranged on the second end 101B.

The wheels 113A, 113B may be coupled to laterally extending frame members 114A, 114B, respectively. The wheels 112A, 112B, 113A, 113B can be bolted directly onto the frame 100, or can include brackets which can be bolted to the frame 100. The wheels 112A, 112B, 113A, 113B and the vehicle wheel 1 may rest on surface G simultaneously. It is noted that while four wheels are depicted, a greater (e.g., 6 or more wheels) or fewer number of wheels are contemplated and possible.

As noted above, the vehicle moving device 10 further includes a driving wheel 104. The driving wheel 104 may be coupled to the frame 100 and sized and positioned to contact a vehicle wheel 1 positioned within the frame 100. The driving wheel 104 may be coupled to the first end 101A (e.g., the first laterally extending member) of the frame 100 and may be configured to contact the vehicle wheel 1 at a first wheel location 4A. The driving wheel 104 may include an outer surface 104A, which interacts with outer surface 1A of the vehicle wheel 1 to cause the vehicle wheel 1 to rotate when the driving wheel 104 is rotated. It is noted that in some embodiments, the driving wheel 104 may be coupled to the second end 101B (e.g., the second laterally extending member) of the frame 100.

Figure 3:
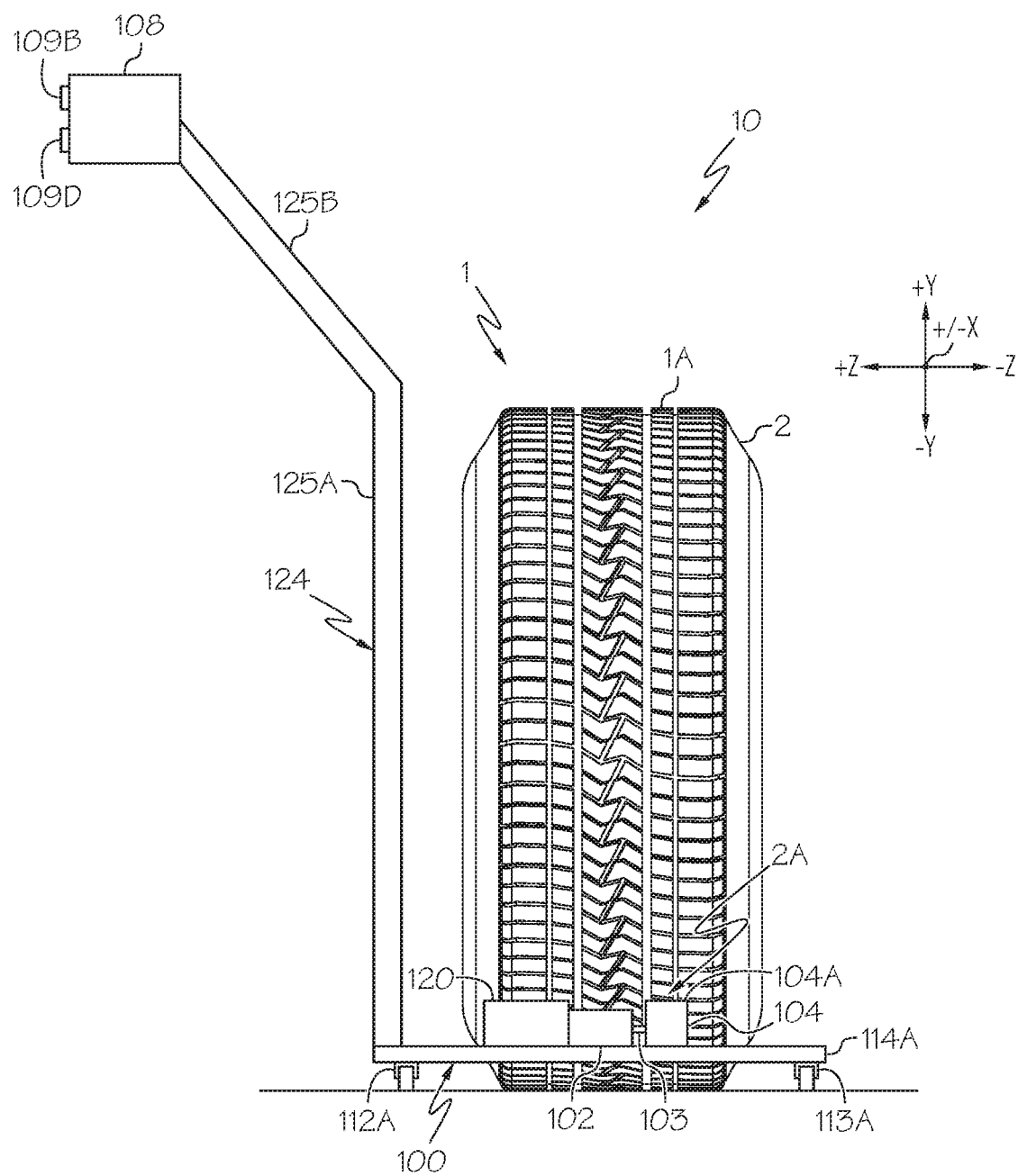
FIG. 3 schematically depicts the vehicle moving device of FIG. 1A as viewed along the +X-axis of the depicted coordinate axes, according to one or more embodiments shown or described herein.

Referring to FIG. 3, a front view of the vehicle moving device 10 when viewed along the +X direction of the depicted coordinate axes is illustrated. As illustrated the driving wheel 104 may only extend laterally past a portion of the vehicle wheel 1. However, it is contemplated that the driving wheel 104 may extend across an entire width of the vehicle wheel 1 in the vehicle lateral direction. Further as illustrated the driving wheel 104 may be positioned so as to contact a tread of the tire 2 of the vehicle wheel 1.

To facilitate rotation of a driving wheel 104, a motor 102 may be operatively coupled to the driving wheel 104 to rotate the driving wheel 104. For example, the motor 102 may rotate the drive shaft 103 coupled to the driving wheel 104. The motor 102 may be coupled to the frame 100 proximate to a position of the driving wheel 104. In some embodiments, the motor 102 may be secured to the frame 100 by a bracket 116. The bracket 116 can be integral with the frame 100 or can be secured to the frame 100 as a separate component using any conventional manufacturing techniques including but not limited to welding, brazing, bolting, etc. The driving wheel 104 may be formed from a hard rubber to provide increased traction between the driving wheel 104 and the vehicle wheel 1.

In some embodiments, the motor 102 may be powered by a battery 120. The battery 120 may be removably or fixedly secured to the frame 100. Additionally, the battery 120 can be either a rechargeable battery or a single-use battery. In some embodiments, the vehicle moving device 10 may not include a battery, and may be directly connected to another power supply, such as a standard 120-volt or 240-volt power outlet via a power cable.

Referring again to FIGS. 1A and 1B, connected to the frame 100 opposite the driving wheel 104 may be the holding arm 106. The holding arm 106 may be pivotally coupled to the second end 101B of the frame 100 (e.g., the second laterally extending frame member 114B). The holding arm 106 may be configured to contact the vehicle wheel 1 at a second wheel location 4B, which may be opposite from the first wheel location 4A in which the driving wheel 104 contacts the vehicle wheel 1. The holding arm 106 may include a proximal end 107A pivotally coupled to the frame 100, and a distal end 107B extending away from the frame 100, which contacts the vehicle wheel 1 at the second wheel location 4B. Through the pivotable connection between the holding arm 106 and the frame 100, the holding arm 106 may be configured to between a first position, wherein the holding arm 106 positioned away from contact with the vehicle wheel 1 positioned within the frame 100 (illustrated in FIG. 1A), and a second position, wherein the holding arm 106 is positioned into contact with the vehicle wheel 1 (illustrated in FIG. 1B). Through such contact, the holding arm 106 may be configured to hold the vehicle wheel 1 in contact with the driving wheel 104 as the driving wheel 104 rotates the vehicle wheel 1.

In some embodiments, the holding arm 106 may further include a tension wheel 118 rotatably coupled to the distal end 107B. The tension wheel 118 may include an outer surface 118A, which contacts the outer surface 1A of vehicle wheel 1. The tension wheel 118 may facilitate the rolling motion of the vehicle wheel 1 as it is driven by the driving wheel 104.

To facilitate movement of the holding arm 106 and to provide adequate holding force to allow the holding arm 106 to bias the vehicle wheel 1 into contact with the driving wheel 104, an actuator 122 may be coupled to holding arm 106. Accordingly, the actuator 122 may be operable to pivot the holding arm 106 between the first position and the second position. In the first position as described above and as shown in FIG. 1A, the tension wheel 118 rotatably coupled to the holding arm 106 is disengaged with the vehicle wheel 1. In the second position as shown in FIG. 1B, the tension wheel 118 driven by the actuator 122 into engagement with the vehicle wheel 1. When in the second position, the surface friction between the driving wheel 104 and vehicle wheel 1 is increased between the holding arm 106 arranged in the first position when compared to the holding arm 106 being in the second position, allowing the driving wheel 104 to cause the vehicle wheel 1 to rotate when the vehicle moving device 10 is activated.

In some embodiments, the actuator 122 may be powered by the same or different power source than the motor 102 is powered by, such as the battery 120 or an independent power source. For example, in some embodiments, the actuator 122 is an electric linearly extending actuator, such as a 24 volt cylinder or an electronically controlled pneumatic actuator.

Referring now to FIG. 2, with the actuator 122 in the second position, the friction between the driving wheel 104 and the vehicle wheel 1 is large enough that when the driving wheel 104 is rotated by the motor 102 in the direction P, the vehicle wheel 1 will rotate in the direction D. Rotation of the vehicle wheel 1 by the driving wheel 104 causes the vehicle to which the vehicle wheel 1 is connected to and the vehicle moving device 10 to simultaneously traverse the surface G. That is, as vehicle wheel 1 is traversing the surface G, wheels 112A, 112B, 113A, 113B will also transverse the surface G along with the vehicle wheel 1 arranged within the frame 100.

To facilitate control of the vehicle moving device 10, a handle 124 may be coupled to the frame 100. The handle 124 may extend above the frame 100 in a vertical direction. In some embodiments, the handle 124 may be used to roll the vehicle moving device 10 over to an awaiting vehicle wheel 1. In some embodiments, the handle 124 may include multiple support sections 125A, 125B. The support sections 125A, 125B may be bent at different angles to allow for ease of use for an operator. For example, support section 125A may extend perpendicularly from the frame 100 (e.g., along the Y-axis of the depicted coordinate axes), while support section 125B may extend at a 45 degree angle from the end of support section 125A. The handle 124 may be manufactured from the same material as the frame 100, and may be rigidly secured to the frame 100 to allow an operator to move the vehicle moving device 10 without having to reach down and grasp the frame 100.

In some embodiments, a user input device 108 may be coupled to the handle 124. For example, the user input device 108 may be arranged on the end of the handle 124. The user input device 108 may be communicatively coupled to the motor 102, the battery 120, and/or the actuator 122, and may be operable to control the various functions thereof. While various user input devices are contemplated, in one embodiment, the user input device 108 may be an electrical 24 V DC panel that includes switches and/or buttons to control various aspects of the vehicle moving device 10.

For example, the user input device 108 may include various inputs 109A, 109B, 109C, 109D. Examples of inputs 109A, 109B, 109C, 109D may include, but are not limited to, at least one of an on/off switch, a variable speed controller, a switch for activation of actuator 122, and an emergency stop. An on/off switch may allow an operator to selectively control operation of the motor 102 between an inactive state and an active state. A variable speed controller input may allow an operator to selectively control the rotational speed that motor 102 rotates driving wheel 104. For example, the operator may cause the motor 102 to rotate the driving wheel 104 faster or slower. A switch for activation of the actuator 122 may control the transition of the holding arm 106 between the first position and the second position, as described above. An emergency stop input may cease all current flow from the battery 120 to the motor 102 and may disengage the holding arm 106 from contact with the vehicle wheel 1. In some embodiments, the inputs 109A, 109B, 109C, 109D may be buttons arranged on the user input device 108, or can be virtual buttons arranged on a touchscreen of the user input device 108 to allow the user input device 108 to receive instructions thereon. It is contemplated that embodiments may include a greater or fewer number of inputs than described herein.

Figure 4:
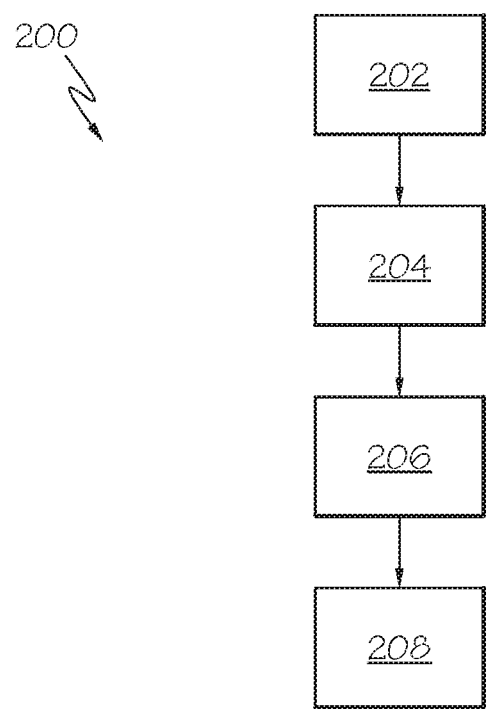
FIG. 4 depicts a method of using the vehicle moving device of FIG. 1A, according to one or more embodiments shown or described herein.

Referring now to FIG. 4, a flow chart depicting a method 200 for moving a vehicle from a first location to a second location using the vehicle moving device 10 (as illustrated in FIGS. 1A-3) is depicted. It is noted that while a number of steps are shown in a specific order, embodiments may include a greater or fewer number of steps in varying orders without departing from the scope of the present disclosure. To begin, at step 202 the method 200 may include arranging the vehicle wheel 1 of the vehicle within the frame 100 of the vehicle moving device 10. For example, and with reference to FIGS. 1A-3, the vehicle moving device 10 may be arranged around vehicle wheel 1 by inserting frame 100 underneath the vehicle which vehicle wheel 1 is attached to. For example, a user may grasp handle 124 and roll the vehicle moving device 10 to a position around the vehicle wheel 1 such that the first laterally extending frame member 114A extends laterally past the vehicle wheel 1 at a position forward of the vehicle wheel 1 and the second laterally extending frame member 114B extends laterally past the vehicle wheel 1 at a position rearward of the vehicle wheel 1 in the vehicle longitudinal direction. The longitudinally extending frame member 110 may extend alongside the vehicle wheel 1 at a position outboard of the vehicle wheel 1.

It is noted that in embodiments, only one vehicle wheel 1 of the vehicle may be engaged with vehicle moving device 10 in order to move the vehicle. However, it is contemplated that more than one wheel may be engaged by one or more vehicle moving devices. For example, two or more wheels of a vehicle may be simultaneously engaged by a single vehicle moving device or additional vehicle moving devices may be used to engage additional vehicle wheels.

Referring again to FIG. 4, step 204 may include contacting the vehicle wheel 1 with the driving wheel 104 at a first location, as illustrated in FIGS. 1A and 1B. Step 206 may include contacting the vehicle wheel 1 at a second wheel location 4B with the holding arm 106 coupled to the second end 101B of the frame 100, opposite the driving wheel 104. For example, and as described above, the holding arm 106 may be moved from a first position wherein the holding arm 106 is disengaged from the vehicle wheel 1 to a second position wherein the holding arm 106 (e.g., the tension wheel 118) is engage with the vehicle wheel 1 an biases the vehicle wheel 1 into contact with the driving wheel 104. For example, an operator may cause the holding arm 106 to move from the first position to the second position by inserting an input into the user input device 108 to activate the actuator 122, as described above.

Still referring to FIG. 4, step 208 includes rotating the vehicle wheel 1 via the driving wheel 104. For example, an operator may input instructions into the user input device 108 to cause the motor 102 to rotate the driving wheel 104. The rotation of the vehicle wheel 1 by the driving wheel 104 causes the vehicle and the vehicle moving device 10 to traverse the surface G from a first location to a second location. During such driving operation by the vehicle moving device 10, the vehicle may be placed in a neutral driving mode.

Once the vehicle has reached a desired location, operation of the motor 102 may be ceased based on an input on the user input device 108 and/or the holding arm 106 can be disengaged by for example, deactivating the actuator 122 via the user input device 108, for example, thereby disengaging the vehicle wheel 1 from the driving wheel 104. In some embodiments, to stop the vehicle being moved, the operator who is steering the vehicle can use the brakes of the vehicle to overcome the driving force supplied by the driving wheel 104. Once stopped and disengaged, the frame 100 can then be removed from around the vehicle wheel 1 by, for example, rolling the vehicle moving device 10 away.

It should now be understood that embodiments described herein are directed to a vehicle moving device for moving a vehicle from one location to a second location and methods for moving a vehicle. The vehicle moving device generally includes a frame, a driving wheel, and a holding arm. As described above, the vehicle moving device may be easily and securely attached to a vehicle wheel without needing to lift the vehicle from contact with the ground. For example and as described herein, the vehicle wheel may be positioned between the driving wheel and holding arm, such that the holding arm may hold the vehicle wheel in contact with the driving wheel as the driving wheel rotates the vehicle wheel. Rotation of the vehicle wheel by the driving wheel may cause the vehicle to move. Since the vehicle is being moved by the motor and not the through the muscle strength of an operator (e.g., through direct contact with an A surface of the vehicle), only one operator is needed to operate the vehicle moving device. In various embodiments, another operator may be positioned within the vehicle to steer the vehicle as it is moved by the vehicle moving device 10. Accordingly, the vehicle may be moved without contacting any vehicle A surface (e.g., finished/painted outer surfaces including but not limited to the hood, trunk, vehicle door panels, or any other vehicle body panels). Furthermore, movement of the vehicle can achieved without lifting a vehicle wheel from contact with the ground.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A vehicle moving device for moving a vehicle from a first location to a second location, the vehicle moving device comprising:
   a frame having a first end and a second end;
   a driving wheel coupled to the first end of the frame and configured to contact a vehicle wheel at a first wheel location;
   a holding arm coupled to the second end of the frame opposite the driving wheel and configured to contact the vehicle wheel at a second wheel location, wherein the holding arm holds the vehicle wheel in contact with the driving wheel as the driving wheel rotates the vehicle wheel;
   a powered actuator operatively coupled to the holding arm, wherein the powered actuator is operable to pivot the holding arm between a first position and a second position; and
   a user input device mounted to the frame and communicatively coupled to the powered actuator, wherein the user input device is configured to move the holding arm between the first position and the second position based on the input and using the powered actuator.

2. The vehicle moving device of claim 1, wherein rotation of the vehicle wheel by the driving wheel causes the vehicle and the vehicle moving device to traverse a surface.

3. The vehicle moving device of claim 1, further comprising one or more wheels coupled to the frame and in contact with a surface, wherein rotation of the vehicle wheel by the driving wheel causes the vehicle and the vehicle moving device to traverse the surface.

4. The vehicle moving device of claim 1, wherein the frame comprises:
   a longitudinally extending frame member extending between the first end and the second end;
   a first laterally extending frame member coupled to the longitudinally extending frame member and defining the first end of the frame;
   a second laterally extending frame member coupled to the longitudinally extending frame member and defining the second end of the frame, wherein the vehicle wheel is arranged between the first and second laterally extending members when the vehicle moving device is mounted to the vehicle wheel.

5. The vehicle moving device of claim 1, wherein the holding arm comprises:
   a proximal end pivotally coupled to the frame;
   a distal end; and
   a tension wheel rotatably coupled to the distal end.

6. The vehicle moving device of claim 5, wherein:
in the first position, the tension wheel is disengaged with the vehicle wheel; and
in the second position, the tension wheel is engaged with the vehicle wheel.

7. The vehicle moving device of claim 1, further comprising a motor operatively coupled to the driving wheel to rotate the driving wheel.

8. The vehicle moving device of claim 7, further comprising a battery mounted to the frame of and configured to power the motor.

9. The vehicle moving device of claim 1, further comprising:
a motor operatively coupled to the driving wheel and configured to rotate the driving wheel; and
a handle coupled to and extending above the frame in a vertical direction, wherein
the user input device is coupled to the handle communicatively coupled to the motor and configured to receive a user input to selectively control of the motor.

10. The vehicle moving device of claim 9, wherein the user input device comprises at least one of:
an on/off switch;
a variable speed controller; and
an emergency stop.

11. A method for moving a vehicle from a first location to a second location using a vehicle moving device, the method comprising:
arranging a vehicle wheel of the vehicle within a frame of the vehicle moving device, the frame comprising a first end and a second end, a driving wheel coupled to the first end of the frame, and a holding arm coupled to the second end of the frame opposite the driving wheel;
contacting the vehicle wheel at a first wheel location with the driving wheel;
receiving a user input on a user input device coupled to the first end of the frame;
actuating the holding arm with a powered actuator communicatively coupled to the user input device and operatively coupled to the holding arm, wherein actuation of the holding arm is based on the user input received from the user input device and the powered actuator is operable to pivot the holding arm between a first position and a second position, wherein:
in the first position, a tension wheel rotatably coupled to the holding arm is disengaged with the vehicle wheel; and
in the second position, the tension wheel is engaged with the vehicle wheel;
contacting the vehicle wheel at a second wheel location with the tension wheel,
wherein the tension wheel holds the vehicle wheel in contact with the driving wheel as the driving wheel rotates the vehicle wheel; and
rotating the driving wheel to move the vehicle from the first location to the second location.

12. The method of claim 11, wherein rotation of the driving wheel rotates the vehicle wheel causing the vehicle and the vehicle moving device to traverse a surface from the first location to the second location.

13. The method of claim 11, further comprising controlling a motor operatively coupled to the driving wheel of the vehicle moving device using the user input device coupled to the frame of the vehicle moving device.

* * * * *